INVENTOR.
HAROLD K. GARNER

US United States Patent Office 3,475,361
Patented Oct. 28, 1969

3,475,361
HIGH IMPACT STRENGTH BLENDS OF VINYL CHLORIDE POLYMERS
Harold K. Garner, Wayne, N.J., assignor to Uniroyal, Inc., a corporation of New Jersey
Filed June 24, 1965, Ser. No. 466,567
Int. Cl. C08f 37/18
U.S. Cl. 260—23                                7 Claims

ABSTRACT OF THE DISCLOSURE

A thermoplastic material containing a component typified by rigid polyvinyl chloride and a compositionally distinct internally plasticized component comprised of a copolymer of vinyl chloride and one or more comonomers selected from the group consisting of vinyl esters of $C_6$-$C_{22}$ monocarboxylic acids, dialkyl maleates and dialkyl fumarates.

---

This invention relates to rigid polyvinyl chloride molding blends having especially high impact strength and methods of further enhancing their impact resistance.

The technique of blending hard polymers, such as polyvinyl chloride and styrene-acrylonitrile copolymer, in various proportions with elastic materials, such as natural and synthetic rubbers, in order to improve the resistance of the hard polymer to mechanical impact is old in the polymerization art. For example, U.S. Patent No. 2,439,-202 discloses the blending of rubbery butadiene-acrylonitrile copolymers with normally rigid and brittle styrene-acrylonitrile copolymers in order to improve the impact resistance of the latter copolymers. In U.S. Patent No. 2,600,024, polyvinyl chloride—by itself such a highly rigid material that it must be plasticized for most uses—is shown to undergo a similar improvement in impact strength when blended with rubbery butadiene-acrylonitrile copolymers.

However, highly impact-resistant blends of rigid polymers with rubbers have certain inherent disadvantages. Because of the highly unsaturated nature of the highly elastic rubbers (such as butadiene-acrylonitrile copolymer rubber), the blends are poorly resistant to deterioration (discoloration and surface-marring) due to weather aging. On the other hand, the polymeric blends of the present invention, consisting of completely saturated compounds, resist deterioration due to weather aging better than either the prior art blends or even unblended, plasticized polyvinyl chloride. In addition, the polymeric blends of this invention have a better combination of heat distortion resistance and weather deterioration resistance than any of the previously known high impact strength thermoplastics. For example, the temperatures at which certain of the blends of this invention first distort from heating is only a few degrees below that at which unmodified rigid polyvinyl chloride first distorts. Also, the hardness of these blends is only slightly lower than that of unmodified rigid polyvinyl chloride. Furthermore, the instant blends demonstrate a high resistance to high energy radiation.

Important advantages of this invention are the ease with which the polymeric components can be blended and the excellent processing and molding characteristics of the blends.

The instant invention is particularly concerned with a hard, resilient, tough thermoplastic resin blend having high impact strength at temperatures ranging from −40° C. to the heat distortion temperature of the blend. The blend comprises (1) a normally rigid polymeric material which is either (A) a homopolymer of vinyl chloride or (B) a copolymer of vinyl chloride containing at least 90% by weight of polyvinyl chloride and copolymerizable monomers; and (2) an internally plasticized copolymer of vinyl chloride and copolymerizable comonomers.

Obviously, it is essentially in the practice of the invention that the rigid component and the internally plasticized component be different. This is no problem whatever when the rigid component is formed from vinyl chloride per se; however, when it is composed of a copolymer of vinyl chloride, it is necessary that a clear compositional distinction be maintained; specifically the internally plasticized component should have at least 10% more comonomers than the rigid component.

Figure 1:
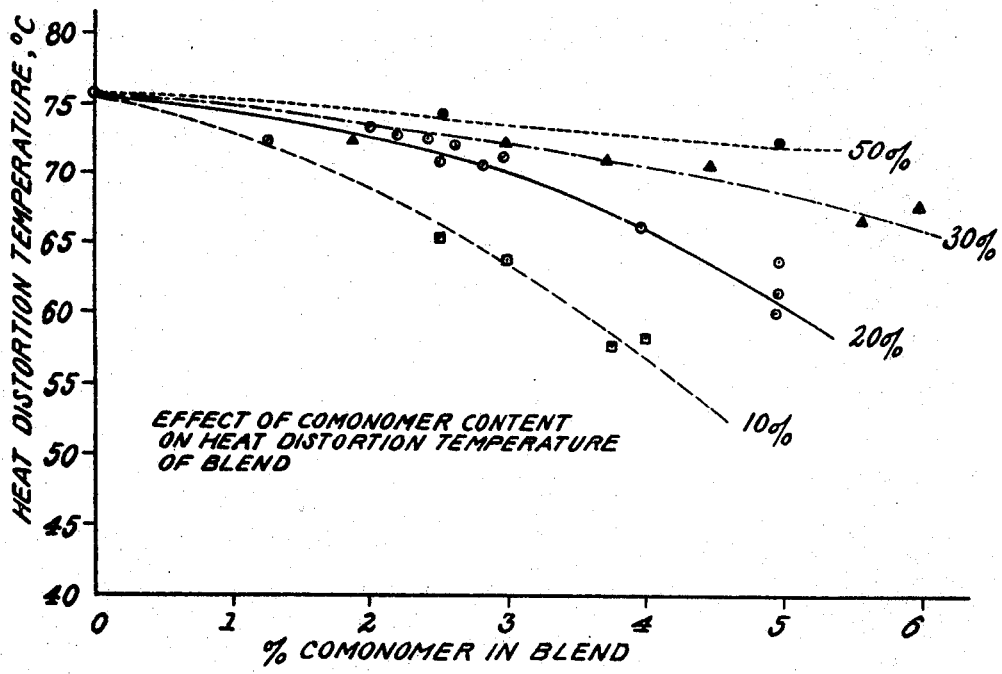
FIG. 1 illustrates the effect of varying comonomer content on the heat distortion property of the blends. The percent of comonomer in the blend is compared directly to the heat distortion temperature, while the effect of varying the percentage of comonomer in respect to the internally plasticized component is shown by the family of curves.

It will be understood that the term "polymer" is used in its broad sense to denote both homopolymers and heteropolymers and that the term "copolymer" is used in its broad sense to denote a heteropolymer which may be composed of any plurality of different types of monomers or comonomers, unless restricted by a specific limitation as to, say, a "binary copolymer" or a "ternary copolymer." Further, even though the examples deal with binary or ternary copolymers, it will be understood that the same principles are applicable to copolymers, such as quaternary copolymers, containing a greater number of or different types of comonomers. Similarly, it will be understood that although the blends will be referred to specifically as blends of a rigid component and an internally plasticized component, the blends may similarly be composed of one or more rigid components and one or more internally plasticized components. Furthermore, it will be understood that when rigid and internally plasticized components are referred to in this specification, this may refer to polymers made by the special suspension polymerization technique to be later described, or to polymers made by standard techniques. It is also to be noted that the term "comonomer" is used only to refer to the non-(vinyl-chloride) monomers of the internally plasticized component.

Rigid polyvinyl chloride is a commercially available material (obtainable, e.g., under the name of "Marvinol VR-10") and methods for its preparation are well known in the polymer art, e.g., see Schildknecht, C. E., "Vinyl and Related Polymers," pp. 392–98 (John Wiley, 1952).

Internally plasticized copolymers of vinyl chloride have been reported hertofore. Among the internally plasticized components which are operable in the instant invention are binary copolymers of vinyl chloride and dialkyl maleate or dialkyl fumarate, in which the alkyl groups contain from 4 to 20 carbon atoms, preferably from 6 to 18 carbon atoms; binary copolymers of vinyl chloride and vinyl esters of carboxylic acids having from 6 to 22 carbon atoms; ternary copolymers of vinyl chloride, dialkyl maleate or fumarate and vinyl esters (as described above).

In order to achieve the best properties for the blend, namely, the best combination of hardness, the impact strength and temperature properties, it is necessary to control the "comonomer contents" in two respects. The term "comonomer content," as used herein means the total amount of monomer or monomers polymerized with, but not including, the vinyl chloride in the internally plasticized component.

Firstly, the "comonomer content of the internally plasticized component" must be controlled; and secondly, the "comonomer content of the blend," the blend being defined as the rigid component plus the internally plasticized component.

Considering first the "comonomer content of the internally plasticized component," it is generally between 10 and 60% by wt., preferably between 20 and 50%. This, of course, provides an internally plasticized component having broadly from 40 to 90% by weight of reacted vinyl chloride and preferably from 50 to 80%. Within these specified ranges the final blend composition has the necessary degree of flexibility. If the content of the vinyl chloride monomer is too high, the comonomer is too rigid and does not sufficiently improve the properties of the polyvinyl chloride; if, on the other hand, the vinyl chloride content is too low the copolymer tends to be soft, too sticky, and tacky; and it is difficult to work in the subsequent blending process. A specific example of a preferred internally plasticized binary copolymer is one prepared from vinyl chloride and dilauryl maleate in the proportions ranging from 60:40 to 80:20 by weight. Expressed in terms of the "comonomer content of the internally plasticized component" the aforesaid ranges are from 40 to 20%. A specific examples of a preferred internally plasticized ternary copolymer is one prepared from vinyl chloride, vinyl stearate, and dilauryl maleate in the proportions ranging from 80:15:5 to 70:20:10 by weight. In terms of the comonomer content these ternary copolymers contain 20 to 30% by weight.

The second ratio of importance is the "comonomer content of the blend." Broadly it is desired that the content range from 1 to 10% by weight, preferably from 2 to 6%. Here, the best combination of high impact strength and high temperature properties is obtained. A particularly outstanding blend is obtained when the comonomer content is maintained from 2.5 to 4% of the total weight of the blended polymers. It can be readily seen that the desired ratios of the material may be obtained by first appropriately adjusting the comonomer content in the internally plasticized component, and, thereafter, selecting the appropriate amounts of the rigid component, based on the comonomer contents in the internally plasticized component.

Much published information is available on methods of preparing the internally plasticized vinyl chloride copolymer component of the blends of this invention. For example, U.S. Patent No. 2,839,509 describes internally plasticized binary copolymers of vinyl chloride and maleic esters of fatty alcohols, e.g., dilauryl maleate; U.S. Patent No. 2,845,404 describes internally plasticized ternary copolymers of vinyl chloride, vinyl stearate and dilauryl maleate; and Port et al., in Ind. Eng. Chem. 47, 472 (1955), describe binary copolymers of vinyl chloride and vinyl stearate which are internally plasticized. Properties of the binary copolymers of vinyl chloride and vinyl stearate and the properties of the ternary copolymers of vinyl chloride, vinyl stearate and dialkyl maleate are similar to those of the alkyl maleate binary copolymers described in the first-cited patent.

The internally plasticized component may be prepared by any of several conventional processes including, by way of example, the following two methods:

(1) By standard suspension (or bead) polymerization

For purposes of illustrating this method, the following is given as an exemplary polymerization recipe:

| Material: | Grams |
| --- | --- |
| Water | 12,000 |
| Vinyl chloride | 3,200 |
| Vinyl stearate | 600 |
| Dilauryl maleate | 200 |
| Lauroyl peroxide (catalyst) | 20 |
| Methyl cellulose (suspending agent) | 20 |

A 5 gallon stainless-steel reactor, having a turbine agitator, is loaded with the water and water-soluble materials (in this case only methyl cellulose) and is subsequently flushed with nitrogen. The nitrogen is in turn flushed out with vinyl chloride, and the reactor is closed. Any supraatmospheric pressure due to the vinyl chloride is vented.

A second vessel, capable of being closed tightly, is loaded with the catalyst (in this case, lauroyl peroxide) and the monomers (in this case, vinyl chloride, vinyl stearate and dilauryl maleate). The vessel is capped, and the vessel and contents are then agitated for 5 minutes at 50° C. to insure that the contents form a homogenous solution. The solution in the second vessel is transferred into the first. It is essential that the monomers and the peroxide catalyst be combined into a homogenous solution prior to admixture with the water and water-soluble materials. If this is not done, gross inhomogeneities may occur in the resulting polymer.

Polymerization is carried out at 50° C. with high agitation. The initial reactor pressure (due to the vapor pressure of the ingredients) is 104 p.s.i.g. The polymerization reaction is carried on until the reactor pressure drops to 50 p.s.i.g.; usually this requires from about 12 to 18 hours depending upon the amount of catalyst present. The polymer is recovered by filtration, washed with water, dried, etc., by conventional methods.

(2) By special suspension polymerization

Using this "special technique," copolymers are initially prepared in much the same way as described above. Extra vinyl chloride is then added and the reaction is continued. Since excess catalyst (e.g., lauroyl peroxide) from the initial copolymerization reaction remains dissolved in the copolymer particles, polymerization of the added vinyl chloride takes place at these sites. In this modified procedure wherein there is an additional polymerization step— the polymerization of additional vinyl chloride in the presence of the copolymer formed by the standard polymerization technique—it is hypothesized that part of the polyvinyl chloride formed is grafted onto the copolymer molecule "backbones" through transfer reactions. For purposes of illustrating this method, the following is given as an exemplary polymerization recipe:

| Material: | Grams |
| --- | --- |
| Water | 11250 |
| Vinyl chloride | 1400 |
| Vinyl stearate | 825 |
| Dilauryl maleate | 275 |
| Methyl cellulose (suspending agent) | 21 |
| Lauroyl peroxide (catalyst) | 30 |
| Sodium tetraphosphate (slightly basic buffer) | 6 |
| Sodium lauryl sulfate (particle size stabilizer) | 1 |

The foregoing are charged initially into a reactor according to the method described for the previous procedure. The polymerization is run at 50° C. with agitation. The initial reactor pressure is 78 p.s.i.g. The polymerization reaction is carried on until the reactor pressure drops to 15 p.s.i.g.; this usually takes from 10 to 15 hours depending upon the amount of catalyst present. Then, an additional 3000 g. of vinyl chloride monomer are added. This raises the reactor pressure to about 100 p.s.i.g. at the operating temperature. The reaction is terminated when the pressure has again dropped to 35 p.s.i.g., which usually takes about from 3 to 5 hours. The polymer is recovered by filtration, washed with water, dried, etc., by conventional methods. The overall monomer feed composition ratios (including the extra 3000 grams of vinyl chloride added in the modified procedure) are identical (80:15:5) for the above examples of the standard and modified or special procedures, yet the polymers produced by these procedures are quite different. It has been found that, when the internally plasticized copolymers are prepared by the modified suspension polymerization technique, the blends (especially the more rigid blends) made from these copolymers have an impact strength which is somewhat superior to that of blends made with internally plasticized copolymers having the same proportions of ingredients, but prepared by the standard suspension polymerization technique. This difference, which is perhaps due to the grafting of part of the polyvinyl chloride onto the basic copolymer molecule "backbone," is illustrated in Examples III and IV below. The main advantage of the modified technique, however, lies in the greater latitude of environmental conditions under which the product can be later processed to form the blends of the instant invention; e.g., mixing cycle times may be reduced and lower shearing forces used, which possibly is due to the pre-blending effect of grafting.

In addition to blends of rigid polyvinyl chloride with internally plasticized copolymers, blends of two or more copolymers have been prepared according to the principles of this invention, as in Example V where at least one copolymer is essentially rigid and at least one copolymer is internally plasticized (more flexible). Such blends of two or more copolymers similarly possess the high impact strength characteristics and other advantages of the blends of polyvinyl chloride with one or more internally plasticized copolymers. Although the blends of this type are usually composed of rigid copolymers and internally plasticized copolymers composed of monomers of the same identity, blends may also be satisfactorily formed from copolymers composed of monomers of different identity and even a different number of monomers.

The rigid components are prepared from the same ingredients and in the same manner (by the general or modified suspension polymerization techniques) as the internally plasticized components, the difference between the two types of components residing in their non-(vinyl chloride) monomer percentages. Whereas the internally plasticized copolymer component of the blend has no more than 90% by weight of vinyl chloride monomer content, the rigid copolymer component of the blend has at least a 90% vinyl chloride monomer content. Internally plasticized copolymers are softer than (i.e., have a Rockwell R hardness less than) unmodified rigid polyvinyl chloride.

The polymeric blends of this invention are easily and quickly prepared. For example, the resins may simply be weighed into a container and intimately mixed with a spatula. If desired, other compounding ingredients, such as coloring materials, heat and light stabilizers, may also be added to the blends. The selection of said ingredients, as well as the amounts thereof for a given commercial product, will be apparent to one skilled in the art. Then, for example, the mix is put directly onto a 3" x 8" steam heated mill (330° F.) and milled for 10 to 20 minutes. Banding takes place within a few seconds, and the milling proceeds smoothly with a well-formed bank.

The composition is removed from the mill as a smooth, glossy surface sheet. The sheet is then desirably pressed into 5" x 5" x 0.10" moldings in an electrically heated laboratory press at 350° F. using a 4 to 5 minute heating cycle. The moldings may be removed from the press while still hot and then chilled quickly in cold water. Blend properties do not appear to be particularly affected by changes in this treatment, such as by cooling in the press.

Any of the conventional light and heat stabilizers for polyvinyl chloride may be used in the blends of my invention, including dibutyl tin maleate, lead stearate, cadmium stearate, barium-cadmium laurate, etc.

It has been found that both the processing characteristics (such as the minimum milling or blending time required to obtain optimum physical properties of the blend) and the impact strength of the polymeric blends of this invention may be further improved by introducing to the blend (as shown in Example VI below) a small amount of a Group II (of the Periodic Table) metal salt of an aliphatic carboxylic acid having from 8 to 20 carbon atoms. This is best accomplished by gradually working the salt into the blend after banding of the polymers has taken place on the mill. Among the salts which are operable herein are calcium stearate, calcium laurate, and cadmium stearate, although, in the preferred embodiments of this aspect of the invention, calcium stearate is used. Amounts ranging from 0.2 to 4 parts by weight of salt, based on 100 parts by weight of blended polymers, have been found to be suitable for the particular purposes stated above, although from 0.5 to 2.5 parts by weight are preferred.

In the family of curves shown in FIG. 1 the effect of the comonomer content in respect to both the internally plasticized component and the total blend on heat distortion temperatures (as measured by the test described below) is clearly illustrated. Each of the blends depicted is composed in part of an internally plasticized component containing vinyl chloride, vinyl stearate, and dilauryl maleate interpolymerized. The blend represented by the upper most curve contains a copolymer which has a comonomer content of 50% and which is composed specifically of 50% vinyl chloride, 25% vinyl stearate and 25% dilauryl maleate. The blends represented by the other curves contain 20% and 10%, 15% and 5%, and 5% and 5% of vinyl stearate and dilauryl maleate, respectively, in the internally plasticized component, the remainder being vinyl chloride.

It can be readily seen from these curves that, as the comonomer content of the internally plasticized component decreases to the lower limit, the heat distortion temperature falls considerably in those blends having a higher percentage of comonomer in the total blend. Or, conversely, FIG. 1 clearly illustrates that at a fixed percentage of comonomer in the blend, the heat distortion temperatures are raised by increasing the comonomer content in the internally plasticized component. Note that a blend having a 50% comonomer content in the internally plasticized component undergoes an initial heat distortion (at 4% comonomer in the blend) at about 75° C., while one containing only 10% undergoes the distortion at 60° C., a difference of about 15° C. Clearly, amounts of comonomer less than 10%, in the internally plasticized component, would form blends even less satisfactory in this respect.

Figure 2:
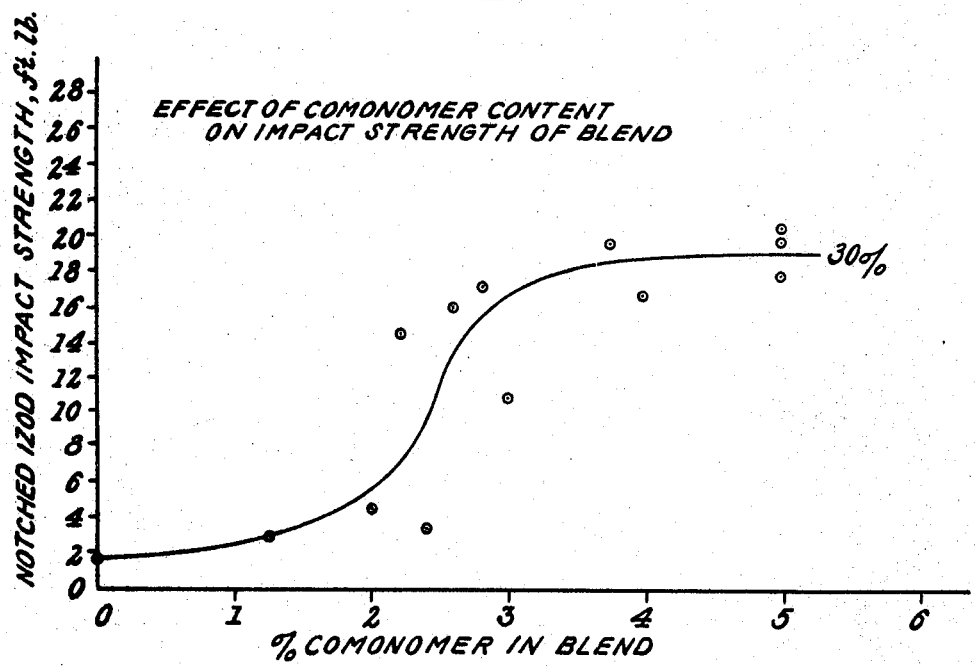
FIG. 2 is exemplary of the effect of the comonomer content on the notched Izod impact strength. The particular curve contains 30% by weight of comonomer in respect to the internally plasticized component.

FIG. 2 illustrates a single curve showing the impact strength of a series of blends formulated from an internally plasticized component having 30% comonomer content in the internally plasticized component, the remainder being vinyl chloride. The 30% is two-thirds vinyl stearate and one-third dilauryl maleate.

A marked improvement in impact strength is noted even at comonomer content in the blend of as little as 1%. The impact strength rises most rapidly between 2% and 3%, approaching a maximum of about 20 ft.-lb., and the high impact strength is maintained at higher percentages, i.e., 4% and 5%, no further significant increase being noted. This curve is typical of the blends obtained by following the teaching of the invention.

Because the internally plasticized copolymer components of the instant blends resist weather-aging better than either plasticized polyvinyl chloride (as shown in Example VII) or the highly unsaturated synthetic rubbers (which are notorious for their low resistance), the blends of the instant invention resist weather-aging more satisfactorily than the conventional high impact blends of polyvinyl chloride and highly unsaturated synthetic rubbers (the rubbers being necessary to impart high impact resistance to polyvinyl chloride). Furthermore, this improved weather-aging characteristic is obtained without substantial detriment to the other properties of the polyvinyl chloride blends.

The blends of this invention have an excellent combination of heat distortion resistance and weather deterioration resistance. In some of these compositions, the temperature at which distortion from heating first occurs is only a few degrees below that at which unmodified polyvinyl chloride becomes distorted, and, similarly, the hardness of such blends is only slightly less than that of unmodified polyvinyl chloride.

Also, the blends of the instant invention are not seriously degraded by irradiation. As a matter of fact, although the color of the blend will darken from the natural blend color which ranges from essentially white to a very light tan, several of the physical characteristics such as impact resistance may actually be improved (as shown in Example VII).

In the examples given below to illustrate certain embodiments of the instant invention, all parts are by weight, and an asterisk (*) represents a failure to note the datum. The dilauryl maleate used in the examples was prepared from commercial lauryl alcohol containing 65–70% of $C_{12}$ alcohol, the balance being $C_{10}$, $C_{14}$, and, in traces, $C_{16}$ and $C_{18}$ saturated alcohols. Substantially the same blend properties are obtained when using a pure lauryl alcohol instead of the commercial lauryl alcohol. The following is a description of the test methods used in the examples:

(1) Impact strength was measured by the notched Izod impact test, American Society for Testing Materials (ASTM) D256–56 Method A (modified by using samples having dimensions of 0.5″ x 2.5″ x 0.1″).

(2) Torsional modulus was measured by ASTM D1043–61T (modified by using samples having dimensions of 0.5″ x 5″ x 0.1″).

(3) Heat distortion temperature was measured by determining the torsional modulus of the specimen at several temperatures. These results were then plotted and the temperature, called the heat distortion temperature, at which the sample would have a torsional modulus of 100,000 lbs./sq. in. was read by interpolation.

(4) Rockwell R hardness was determined according to ASTM D785–51.

EXAMPLE I

This example illustrates the preparation and advantages of blends of rigid polyvinyl chloride with internally plasticized binary copolymers of vinyl chloride and various comonomers. The copolymer is prepared by the conventional suspension polymerization method described above. The amounts of polyvinyl chloride and copolymer indicated in Table I are weighed into a beaker, and lead stearate is added thereto as a heat stabilizer. The mixture is blended on 3″ x 8″ two roll mill at 330° F. for 15 minutes, calcium stearate being added on the rollers as soon as banding (the fusing of the components to form a tacky, soft mix which hugs the rollers) occurs. The resultant sheet is then molded at 350° F. for 5 minutes on a 5″ x 5″ electrically heated press under a pressure of 400 p.s.i. This procedure is referred to hereinafter as the "standard" technique. Proportions and properties for a number of such blends are shown in Table I. The magnitudes of these properties for the components of blends P and Q are also listed in the table (under the heading "Controls") in order to emphasize the value of blending.

TABLE I

| | Blend | | | | | | | | | | | | | | | Controls | |
|---|---|---|---|---|---|---|---|---|---|---|---|---|---|---|---|---|---|
| | A | B | C | D | E | F | G | H | J | K | L | M | N | P | Q | | |
| Polyvinyl chloride, wt. percent | 80 | 85 | 85 | 90 | 80 | 85 | 85 | 90 | 80 | 85 | 85 | 90 | 95 | 60 | 70 | 100 | 0 |
| Internally plasticized, binary copolymer, wt. percent | 20 | 15 | 15 | 10 | 20 | 15 | 15 | 10 | 20 | 15 | 15 | 10 | 5 | 40 | 30 | 0 | 100 |
| Composition: | | | | | | | | | | | | | | | | | |
| Vinyl chloride, wt. percent | 80 | 80 | 70 | 70 | 80 | 80 | 70 | 70 | 80 | 80 | 70 | 65 | 65 | 90 | 90 | | 90 |
| Comonomer, wt. percent | 20 | 20 | 30 | 30 | 20 | 20 | 30 | 30 | 20 | 20 | 30 | 35 | 35 | 10 | 10 | | 10 |
| Comonomer, identity | (a) | (a) | (a) | (a) | (b) | (b) | (b) | (b) | (c) | (c) | (c) | (d) | (d) | (d) | (d) | | (d) |
| Calcium stearate | 1 | 1 | 1 | 1 | 1 | 1 | 1 | 1 | 1 | 1 | 1 | 1 | 1 | 1 | 1 | | 1.25 |
| Lead stearate, wt. percent | 2 | 2 | 2 | 2 | 2 | 2 | 2 | 2 | 2 | 2 | 2 | 2 | 2 | 2 | 2 | | 1.25 |
| Comonomer content, wt. percent: | | | | | | | | | | | | | | | | | |
| Of blend | 4.0 | 3.0 | 4.5 | 3.0 | 4.0 | 3.0 | 4.5 | 3.0 | 4.0 | 3.0 | 4.5 | 3.5 | 1.8 | 4.0 | 3.0 | 0 | 10 |
| Of internally plasticized comp | 20 | 20 | 30 | 30 | 20 | 20 | 30 | 30 | 20 | 20 | 30 | 35 | 35 | 10 | 10 | 0 | 10 |
| Physical properties, notched Izod impact strength: | | | | | | | | | | | | | | | | | |
| At plus 25° C. ·ft. lb | 21.2 | 15.9 | 22.3 | 20.9 | 1.8 | 1.9 | 2.5 | 2.6 | 21.7 | 12.4 | 20.9 | 24.4 | 22.5 | 1.9 | 2.2 | 1.4 | 0.6 |
| At −20° C. ft. lb | 1.5 | 1.0 | 1.7 | 1.0 | 0.9 | 0.8 | 0.8 | 0.8 | 1.7 | 1.0 | 1.2 | 1.4 | 1.0 | 1.1 | 0.8 | (*) | (*) |
| At −40° C. ft. lb | 1.2 | 0.9 | 1.1 | 1.1 | 0.6 | 0.7 | 0.8 | 0.8 | 0.9 | 0.8 | 1.1 | 1.1 | 0.8 | 0.8 | 0.9 | (*) | (*) |
| Rockwell R hardness (75° F.) | 113 | 113 | 107 | 113 | 115 | 117 | 116 | 116 | 116 | 114 | 111 | 110 | 114 | 119 | 119 | 122 | 121 |
| Heat distortion temp., ($T_{100,000}$), °C | 67.3 | 71.7 | 70.0 | 74.2 | 65.9 | 71.2 | 68.8 | 71.9 | 70.0 | 70.9 | 69.1 | 72.1 | 74.3 | 61.9 | 68.3 | 76.0 | 47.5 | a Vinyl stearate.
b Dibutyl maleate.
c Di-2-ethylhexyl maleate.
d Dilauryl maleate.

The above table clearly shows the approved impact strength of a wide variety of blends prepared in accordance with the teaching of the invention. Blends E, F, G and H show that a small, but significant, improvement is obtained when the comonomer of the internally plasticized component is dibutyl maleate. Within the broad definition of the invention, this compound has the lowest number of carbon atoms in the alkyl group. In contrast, the results obtained with substantially comparable formulations of the preferred dilauryl maleates and the di-2-ethylhexyl maleates are particularly outstanding. The alkyl groups of these compounds have twelve and eight carbon atoms, respectively. Note particularly runs P and Q where the comonomer contents of the internally plasticized component is only 10%, that is, on the border on the broad range of desired compositions. In these cases a reduced impact strength, as compared to the preferred blends, is noted. However, by comparing these results with the controls, it is apparent that some improvement in impact strength is obtained nonetheless.

EXAMPLE II

This example illustrates the preparation and advantages of blends of rigid polyvinyl chloride with internally plasticized ternary copolymers of vinyl chloride and various comonomers. Preparation of the copolymers and blends is as in Example I. Proportions and properties for a number of such blends are shown in Tables IIA and IIB. Values for the components of blend H of Table IIA are shown in columns J and K to emphasize the value of blending.

TABLE IIA

|  | Blend | | | | | | | | | | | |
|---|---|---|---|---|---|---|---|---|---|---|---|---|
|  | A | B | C | D | E | F | G | H | I | J | K | L** |
| Polyvinyl chloride, wt. percent | 75 | 90 | 95 | 90 | 80 | 95 | 90 | 70 | 60 | 100 | 0 | 100 |
| Internally plasticized ternary copolymer, wt. percent | 25 | 10 | 5 | 10 | 20 | 5 | 10 | 30 | 40 | 0 | 100 | 0 |
| Composition: | | | | | | | | | | | | |
| Vinyl chloride, wt. percent | 80 | 70 | 50 | 50 | 70 | 60 | 60 | 85 | 90 |  | 85 |  |
| Vinyl stearate, wt. percent | 15 | 20 | 25 | 25 | 20 | 20 | 20 | 7.5 | 5 |  | 7.5 |  |
| Dilauryl maleate, wt. percent | 5 | 10 | 25 | 25 | 10 | 20 | 20 | 7.5 | 5 |  | 7.5 |  |
| Calcium stearate, wt. percent | 1 | 1 | 1 | 1 | 1 | 1 | 1 | 1 | 1 |  | 1 |  |
| Lead stearate, wt. percent |  | 2 | 2 | 2 | 2 | 2 | 2 | 2 | 2 |  |  |  |
| Dibutyl tin maleate (heat stabilizer), wt. percent | 1.5 |  |  |  |  |  |  |  |  |  | 1.5 |  |
| Comonomer Content, wt. percent: | | | | | | | | | | | | |
| Of blend | 5.0 | 3.0 | 2.5 | 5.0 | 6.0 | 5.0 | 4.0 | 3.5 | 4.0 | 0 | 15 | 0 |
| Of internally plasticized component | 20 | 30 | 50 | 50 | 30 | 40 | 40 | 15 | 10 | 0 | 15 | 0 |
| Physical properties, notched izod impact strength: | | | | | | | | | | | | |
| At plus 25° C. ft. lb | 19.4 | 22.7 | 22.9 | 21.6 | 24.8 | 18.8 | 20.7 | 17.4 | 6.6 | 1.4 | 1.2 | 0.5 |
| At minus 20° C. ft. lb | 1.2 | 1.2 | 1.1 | 1.1 | 2.4 | 1.0 | 1.0 | 1.2 | 1.1 | (*) | (*) | (*) |
| At minus 40° C. ft. lb | 0.7 | 1.0 | 0.9 | 0.8 | 1.6 | 0.7 | 0.8 | 0.9 | 0.9 | (*) | (*) | (*) |
| Rockwell R hardness (75° F.) | 108 | 113 | 111 | 103 | 103 | 115 | 110 | 115 | 116 | 122 | 90 | 122 |
| Heat distortion temp., ($T_{100,000}$) ° C | 60.8 | 71.9 | 74.1 | 71.9 | 67.8 | 75.7 | 73.5 | 58.7 | 58.3 | 76.0 | 29.8 | 76 |

** Also containing 5 parts of dioctyl phthalate (softener) and 1 part of dibutyl tin dilaurate.

TABLE IIB

|  | Blend | | | | | | | |
|---|---|---|---|---|---|---|---|---|
|  | A | B | C | D | E | F | G | H |
| Polyvinyl chloride, wt. percent | 90 | 85 | 80 | 85 | 90 | 80 | 85 | 90 |
| Internally plasticized ternary copolymer, wt. percent | 10 | 15 | 20 | 15 | 10 | 20 | 15 | 10 |
| Composition: | | | | | | | | |
| Component A | (a) | (a) | (a) | (a) | (a) | (a) | (a) | (a) |
| Component B | (b) | (b) | (c) | (c) | (c) | (c) | (c) | (c) |
| Component C | (d) | (d) | (e) | (e) | (e) | (f) | (f) | (f) |
| Ratio A/B/C | 65/20/15 | 65/20/15 | 80/10/10 | 70/15/15 | 70/15/15 | 80/10/10 | 70/15/15 | 70/15/15 |
| Calcium stearate, wt. percent | 1 | 1 | 1 | 1 | 1 | 1 | 1 | 1 |
| Lead stearate, wt. percent | 2 | 2 | 2 | 2 | 2 | 2 | 2 | 2 |
| Comonomer Content, wt. percent: | | | | | | | | |
| Of blend | 3.5 | 5.3 | 4.0 | 4.5 | 3.0 | 4.0 | 4.5 | 3.0 |
| Of internally plasticized component | 35 | 35 | 20 | 30 | 30 | 20 | 30 | 30 |
| Physical Properties, Notched Izod Impact Strength: | | | | | | | | |
| At plus 25° C. ft. lb | 20.4 | 24.2 | 6.7 | 14.4 | 2.9 | 9.6 | 21.8 | 3.2 |
| At Minus 20° C. ft. lb | 1.0 | 1.0 | 1.0 | 1.5 | 0.8 | 1.0 | 1.2 | 1.1 |
| At Minus 40° C. ft. lb | 0.8 | 0.8 | 0.9 | 1.0 | 0.9 | 1.0 | 1.2 | 0.9 |
| Rockwell R hardness (75° F.) | 111 | 107 | 115 | 116 | 114 | 116 | 111 | 115 |
| Heat distortion temp., ($T_{100,000}$) ° C | 72.4 | 68.9 | 64.6 | 70.1 | 71.6 | 66.4 | 69.1 | 74.7 | a Vinyl chloride.
b Vinyl 2-ethyl hexoate.
c Vinyl stearate.
d Dilauryl maleate.
e Dibutyl maleate.
f Di-2-ethyl hexyl maleate.

Table IIA shows the particularly good heat distortion temperatures and impact strength obtained with the ternary copolymer blend. Note that in runs H and I, where the internally plasticized component has a comparatively low comonomer content, that the impact strength and the heat distortion temperaure are no as outstanding as in runs A through G. A significant increase in impact strength is noted in even these poorer runs as compared to the unblended polymers illustrated in runs J, K and L of Table IIA.

Table IIB shows several other ternary systems which may be advantageously used in the practice of the invention. While runs C, D, and E do not show as good an impact strength as runs A, B and G, they are superior to unblended vinyl chloride. Again the short alkyl chain in the dibutyl maleate, a significant part of the comonomer in the internally plasticized component of those blends, accounts for the less effective results. Run E suffers from the further shortcoming of having only a marginal amount of comonomer in the internally plasticized component. Run H shows particularly outstanding heat distortion properties as contrasted to the other blends and represents a good improvement in impact strength in contrast to the unblended polyvinyl chloride.

EXAMPLE III

This example illustrates the preparation and advantages of blends of rigid polyvinyl chloride with internally plasticized copolymers of vinyl chloride made by the "special technique." For one such blend, 42 parts of vinyl chloride are copolymerized with 58 parts of dilauryl maleate according to the standard method above. This copolymer serves as the "backbone" for the additional polymerization step to follow. Additional vinyl chloride (at least 66 parts) is then added and the polymerization is continued. The additional vinyl chloride partially polymerizes on to the copolymer backbone and partially forms a homopolymer as the reaction continues. The final polymer is formed from a total of 65 parts vinyl chloride and 35 parts dilauryl maleate. Then, 10 parts of this copolymer are blended with 90 parts of polyvinyl chloride as in Example I. Compositions and properties of two such blends (Blends A & B) are shown in Table III and may be compared, respectively, with those of dilauryl maleate comonomer Blend N of Table I and, roughly, with those of vinyl stearate comonomer Blend D of Table I, the compositions and properties of these blends (produced by the standard suspension polymerization technique) being reproduced in Table III.

TABLE III

| | Blend | | | |
|---|---|---|---|---|
| | A | N | B | D |
| Polyvinyl chloride, wt. percent | 90 | 90 | 90 | 90 |
| Internally plasticized binary copolymer, wt. percent | 10 | 10 | 10 | 10 |
| Composition, "backbone": | | | | |
| Vinyl chloride, wt. percent | 42 | | 42 | |
| Comonomer, identity | Dilauryl | Maleate | Vinyl | Stearate |
| Comonomer, wt. percent | 58 | | 58 | |
| Composition, overall: | | | | |
| Vinyl chloride, wt. percent | 65 | 65 | 65 | 70 |
| Comonomer, wt. percent | 35 | 35 | 35 | 30 |
| Calcium stearate | 1 | 1 | 1 | 1 |
| Lead stearate | 2 | 2 | 2 | 2 |
| Physical properties, notched Izod impact strength: | | | | |
| At plus 25° C. ft. lb | 23.7 | 24.4 | 23.1 | 20.9 |
| At minus 20° C. ft lb | 2.4 | 1.4 | 1.2 | 1.0 |
| At minus 40° C. ft. lb | 1.1 | 1.1 | 1.0 | 1.1 |
| Rockwell R hardness (75° F.) | 110 | 110 | 111 | 113 |
| Heat distortion temp., ($T_{100,000}$), °C | 72.1 | 72.1 | 74.2 | 74.2 |

The above table illustrates, in runs A and B, that outstanding physical properties are obtained by following the special procedure outlined above. While there are no additional advantages in the physical properties obtained, the polymers prepared in accordance with this special procedure are much more readily processed and yield a more dependable and reproducible product.

EXAMPLE IV

This example illustrates the preparation and advantages of blends of rigid polyvinyl chloride with internally plasticized ternary copolymers of vinyl chloride, vinyl stearate and dilauryl maleate made by the special polymerization method above. The copolymer is made, as in Example III, by first preparing, by ordinary suspension polymerization techniques, the ternary copolymer backbone. Additional vinyl chloride is then polymerized on to this backbone as in the special method above and the blend is finally prepared as in Example III.

Compositions and properties of various such blends are shown in Table IV and Blends A and B of Table IV may be very roughly compared with Blend E of Table II; similarly, Blends C and D of Table IV may be compared with Blend G of Table II, and Blend E of Table IV, with Blend F of Table II.

These comparisons again illustrate the alternative blending procedure which is particularly dependable and is satisfactory from the standpoint of the physical properties of the polymers produced.

TABLE V

| | Blend | | | |
|---|---|---|---|---|
| | A | B | C | D |
| Rigid binary copolymer, wt. percent | 80 | 50 | 50 | 50 |
| Composition: | | | | |
| Vinyl chloride, wt. percent | 95 | 95 | 95 | 90 |
| Dilauryl maleate, wt. percent | 5 | 5 | 5 | 10 |
| Internally plasticized binary copolymer, wt. percent | 20 | 50 | 50 | 50 |
| Composition: | | | | |
| Vinyl chloride, wt. percent | 75 | 85 | 80 | 80 |
| Dilauryl maleate, wt. percent | 25 | 15 | 20 | 20 |
| Physical properties, notched Izod impact strength at Plus 25° C. ft. lb | 16.8 | 18.3 | 20.7 | 18.6 |
| Rockwell R hardness (75° F.) | 84 | 84 | 68 | 73 |
| Heat distortion temp., ($T_{100,000}$), °C | 37.3 | 33.4 | (*) | (*) |

EXAMPLE VI

This example illustrates the advantage of adding a salt of a carboxylic acid, such as calcium stearate, during blending. Use of the salt is equally advantageous when blending with homopolymers or with either binary or ternary copolymers, whether prepared by the standard or the special polymerization techniques. Table VIA shows the differences in physical properties for blends, which are otherwise identical, when calcium stearate is and is not used in the blending. It will be seen that, while even the blends are made without calcium stearate have higher impact strengths than the control composition of a rigid

TABLE IV

| | Blend | | | | |
|---|---|---|---|---|---|
| | A | B | C | D | E |
| Polyvinyl chloride, wt. percent | 80 | 80 | 90 | 85 | 95 |
| Internally plasticized ternary copolymer, wt. percent | 20 | 20 | 10 | 15 | 5 |
| Composition, "backbone", vinyl chloride/vinyl stearate/dilauryl maleate | 60/30/10 | 43.5/42.5/14 | 42/31/27 | 42/31/27 | 45/27.5/27.5 |
| Composition, overall, vinyl chloride/vinyl stearate/dilauryl maleate | 80/15/5 | 80/15/5 | 65/18.5/16.5 | 65/18.5/16.5 | 67.5/16.25/16.25 |
| Calcium stearate, wt. percent | 1 | 1 | 1 | 1 | 1 |
| Lead stearate, wt. percent | 2 | 2 | 2 | 2 | 2 |
| Physical Properties, notched Izod impact strength: | | | | | |
| At Plus 25° C. ft. lb | 24.6 | 24.9 | 24.1 | 23.4 | 20.4 |
| At Minus 20° C. ft. lb | 2.6 | 2.5 | 1.9 | 1.6 | 0.95 |
| At Minus 40° C. ft. lb | 1.2 | 1.8 | 1.1 | 1.3 | 1.0 |
| Rockwell R hardness (75° F.) | (*) | 111 | 109 | 103 | 113 |
| Heat distortion temp., ($T_{100,000}$), °C | 70.3 | 74.4 | 73.1 | 70.7 | 76.3 |

EXAMPLE V

This example illustrates that it is possible to produce thermoplastics of high impact strength by making blends of rigid copolymers of polyvinyl chloride with internally plasticized copolymers of polyvinyl chloride. Each copolymer is prepared as in the standard method above, and they are then blended with each other and treated just as are the copolymer and polyvinyl chloride of Example I. Compositions and properties of some of these blends using binary copolymers are shown in Table V. Although blending of copolymer components which each have the same monomer or monomers is normally used, blends can also be prepared from copolymer components which each have a different monomer or different monomers.

ternary copolymer of polyvinyl chloride, the addition of 1.25 parts of the salt to 100 parts of the blend increases the impact strength at least fivefold.

Table VIB shows the effect of the concentration of calcium stearate upon the milling or blending time necessary to produce optimum properties. While doubling the amount of calcium stearate benefits the impact strength if only 5 minutes of milling are used (compare Blends A & C), no advantage is derived from increasing the amount of the salt when longer milling times, e.g., 10 minutes, are employed (compare Blends B & D).

Table VIA also illustrates specifically a blend formed from rigid polyvinyl chloride (or a rigid copolymer of polyvinyl chloride) and two internally plasticized ternary copolymers of polyvinyl chloride.

TABLE VIA

|  | Blend | | | | |
|---|---|---|---|---|---|
|  | A | B | C | D | Control |
| Polyvinyl chloride, wt. percent | 75 | 75 | 75 | 75 | 0 |
| Internally plasticized ternary copolymer I, wt. percent | 19 | 19 | 25 | 25 | 100 |
| Composition, vinyl chloride/vinyl stearate/dilauryl maleate | 80/15/5 | 80/15/5 | 80/15/5 | 80/15/5 | 90/5/5 (Rigid) |
| Internally plasticized ternary copolymer II, wt. percent | 6 | 6 |  |  |  |
| Composition, vinyl chloride/vinyl stearate/dilauryl maleate | 70/20/10 | 70/20/10 |  |  |  |
| Dibutyl tin maleate (heat stabilizer) wt. percent | 1.88 | 1.88 | 1.88 | 1.88 | 1.88 |
| Calcium stearate, wt. percent |  | 1.25 |  | 1.25 | 1.25 |
| Physical characteristics, notched Izod impact strength: |  |  |  |  |  |
| At +25° C., ft. lb | 3.3 | 16.9 | 2.2 | 19.4 | 0.8 |
| At −20° C., ft. lb | 0.9 | 2.2 | 0.8 | 1.2 | (*) |
| At −40° C., ft. lb | 0.9 | 1.7 | 0.6 | 0.7 | (*) |
| Rockwell R hardness (75° F.) | 110 | 103 | 114 | 108 | 108 |
| Heat distortion temp., ($T_{100,000}$), ° C | 62.8 | 61.8 | 63.6 | 60.8 | 38.7 |

TABLE VIB

|  | Blend | | | |
|---|---|---|---|---|
|  | A | B | C | D |
| Polyvinyl chloride, wt. percent | 75 | 75 | 75 | 75 |
| Internally plasticized ternary copolymer, wt. percent | 25 | 25 | 25 | 25 |
| Composition, vinyl chloride/vinyl stearate/dilauryl maleate | 80/15/5 | 80/15/5 | 80/15/5 | 80/15/5 |
| Dibutyl tin maleate (heat stabilizer) | 1.88 | 1.88 | 1.88 | 1.88 |
| Calcium stearate | 1.25 | 1.25 | 2.50 | 2.50 |
| Milling temp., ° F | 330 | 330 | 330 | 330 |
| Milling time, min | 5 | 10 | 5 | 10 |
| Physical properties, notched Izod impact strength: |  |  |  |  |
| At +25° C., ft. lb | 4.4 | 17.7 | 12.5 | 16.9 |
| At −20° C., ft. lb | 1.9 | 1.9 | 1.5 | 1.7 |
| At −40° C., ft. lb | 1.1 | 0.8 | 1.3 | 1.4 |
| Rockwell R hardness (75° F.) | 108 | 109 | 105 | 106 |
| Heat distortion temp. ($T_{100,000}$), ° C | 57.7 | 59.5 | 59.8 | 61.5 |

EXAMPLE VII

This example illustrates the high resistance of the blends of the instant invention to high energy radiation. Samples of blends wherein the internally plasticized copolymer was prepared by the standard (Blend C) and special (Blends A & B) polymerization techniques were subjected to an exposure of 20 watt hours/lb. from a $2 \times 10^6$ volt Van de Graaff electron accelerator and the results are reported in Table X. Although the samples (originally ranging in color from essentially white to a very light tan) were turned dark brown by the treatment, their impact strengths were actually improved in some cases, and their heat distortion temperatures and Rockwell R hardness test values were still in acceptable ranges.

TABLE VII.—EFFECT OF ELECTRON BEAM ON PHYSICAL PROPERTIES OF BLENDS

|  | Blend | | |
|---|---|---|---|
|  | A | B | C |
| Polyvinyl chloride, wt. percent | 90 | 85 | 85 |
| Internally plasticized ternary copolymer, wt. percent | 10 | 15 | 15 |
| Composition, "backbone", vinyl chloride/vinyl stearate/dilauryl maleate | 50/25/25 | 56/33/11 |  |
| Composition overall, vinyl chloride/vinyl stearate/dilauryl maleate | 70/15/15 | 80/15/5 | 80/15/5 |
| Calcium stearate, wt. percent | 1 | 1 | 1 |
| Lead stearate, wt. percent | 2 | 2 | 2 |
| Physical Properties before/after radiation with 20 watt hours per pound of $2 \times 10^6$ volt electrons | | | |
| Notched Izod impact strength (25° C.), ft. lb | 26.4/25.7 | 23.2/25.5 | 19.3/21.4 |
| Rockwell R hardness (75° C.) | —/106 | —/107 | 117/112 |
| Torsional or rigidity modulus, (25° C.), $10^{-3}$ p.s.i. | 320/299 | 342/317 | 380/366 |
| Heat distortion temp., ($T_{100,000}$), ° C | 74.5/70.9 | 73.0/68.9 | 72.1/68.8 |

Having thus described my invention, what I claim and desire to protect by Letters Patent is:

1. A thermoplastic composition high in impact strength comprising a blend of (1) a normally rigid polymeric material selected from the group consisting of a homopolymer of vinyl chloride and copolymers of at least 90% by weight of vinyl chloride copolymerized with at least one monomer selected from the group consisting of vinyl esters of monocarboxylic acids having from 6 to 22 carbon atoms and dialkyl maleates and fumarates in which the alkyl groups contain from 4 to 20 carbon atoms and (2) an internally plasticized component comprising a copolymer of vinyl chloride copolymerized with at least one comonomer selected from the group consisting of vinyl esters of monocarboxylic acids having from 6 to 22 carbon atoms and dialkyl maleates and fumarates in which the alkyl groups contain from 4 to 20 carbon atoms, said comonomer in said internally plasticized component constituting from 10 to 60% by weight of said internally plasticized component and from 1 to 10% by weight of the total blend, and the vinyl chloride content of said rigid polymeric material being at least 10% greater than the vinyl chloride content of said internally plasticized component.

2. The composition of claim 1 wherein the comonomer content of said internally plasticized component is equal to from 2 to 6% by weight of the total blend.

3. The composition of claim 1 wherein the comonomer content of said internally plasticized component is equal to from 2.5 to 4% by weight of the total blend.

4. The composition of claim 1 wherein the comonomer in said internally plasticized component constitutes from 20 to 50% by weight of said internally plasticized component.

5. The composition of claim 1 wherein said internally plasticized component is a binary copolymer of vinyl chloride and dilauryl maleate in proportions ranging from 60:40 to 80:20 by weight.

6. The composition of claim 1 wherein said internally plasticized component is a ternary copolymer of vinyl chloride, vinyl stearate and dilauryl maleate in proportions ranging from 80:15:5 to 70:20:10 by weight.

7. The composition of claim 1 including from 0.2 to 4 parts by weight per 100 parts of the blend of component (1) and component (2) of a Group II metal salt of an aliphatic monocarboxylic acid having from 8 to 20 carbon atoms.

References Cited

UNITED STATES PATENTS

| | | | |
|---|---|---|---|
| 2,404,780 | 7/1946 | Arnold | 260—78.5 |
| 2,746,944 | 5/1956 | Naps et al. | 260—86.3 |
| 2,839,509 | 6/1958 | Garner | 260—78.5 |
| 2,868,763 | 1/1959 | Montgomery | 260—899 |
| 3,091,597 | 5/1963 | Henriques | 260—899 |
| 3,145,187 | 8/1964 | Hankey et al. | 260—23 |
| 3,167,598 | 1/1965 | Heaps et al. | 260—876 |
| 3,168,594 | 2/1965 | Hoshi et al. | 260—899 |
| 3,230,206 | 1/1966 | Albert et al. | 260—86.3 |
| 3,268,623 | 8/1966 | Beer | 260—876 |

OTHER REFERENCES

Schildknecht, "Vinyl and Related Polymers," 1952, pp. 406 and 407.

DONALD E. CZAJA, Primary Examiner

R. A. WHITE, Assistant Examiner

U.S. Cl. X.R.

260—45.75, 876, 884, 899